(12) United States Patent
Du et al.

(10) Patent No.: US 8,609,250 B2
(45) Date of Patent: Dec. 17, 2013

(54) DEVICE HOUSING AND METHOD FOR MAKING SAME

(75) Inventors: Qi-Jian Du, ShenZhen (CN); Chwan-Hwa Chiang, New Taipei (TW)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 188 days.

(21) Appl. No.: 13/207,106

(22) Filed: Aug. 10, 2011

(65) Prior Publication Data

US 2012/0225286 A1    Sep. 6, 2012

(30) Foreign Application Priority Data

Mar. 1, 2011   (CN) .......................... 2011 1 0048399

(51) Int. Cl.
*B32B 27/40*   (2006.01)

(52) U.S. Cl.
USPC .......................................... 428/425.9; 428/457

(58) Field of Classification Search
USPC ................................................ 428/457, 425.9
See application file for complete search history.

(56) References Cited

U.S. PATENT DOCUMENTS

| | | | | |
|---|---|---|---|---|
| 3,671,470 A | * | 6/1972 | Case | ............................ 521/166 |
| 7,285,314 B2 | * | 10/2007 | Mukunoki et al. | ........... 428/36.6 |
| 2007/0004816 A1 | * | 1/2007 | Yashiro et al. | .................. 522/69 |

* cited by examiner

*Primary Examiner* — Thao T. Tran
(74) *Attorney, Agent, or Firm* — Altis Law Group, Inc.

(57) ABSTRACT

A device housing includes a substrate, a metallic coating formed on the substrate by vacuum sputtering or vacuum vapor deposition, and a self-repairing coating formed on the metallic coating. The self-repairing coating substantially includes trimethylene oxide and polyhydric alcohols.

8 Claims, 1 Drawing Sheet

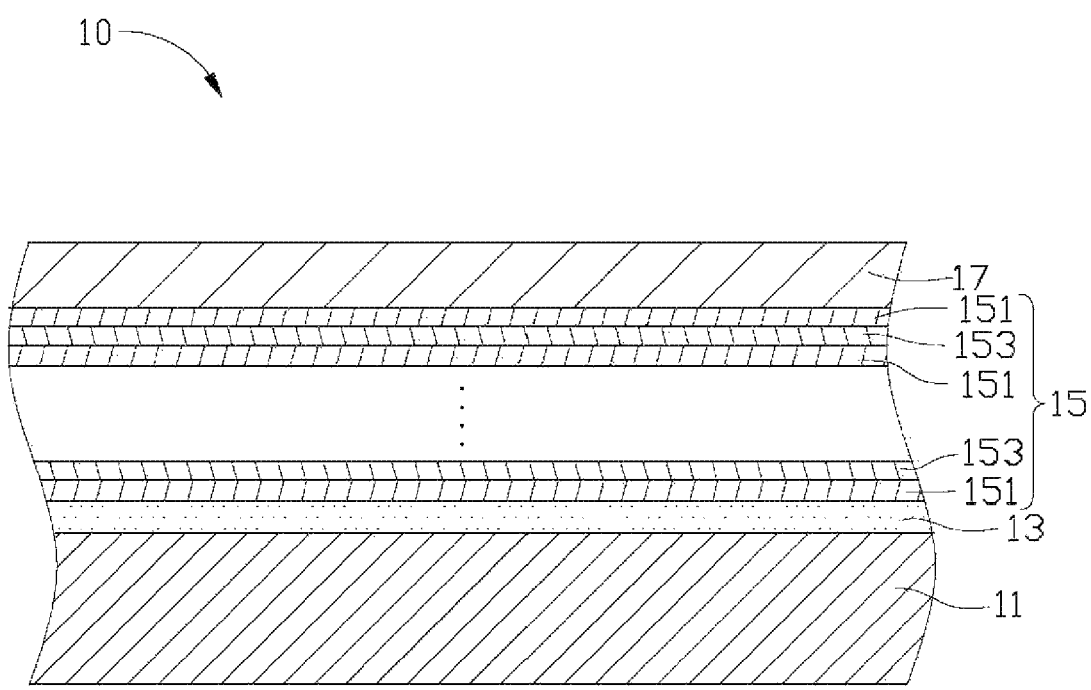

DEVICE HOUSING AND METHOD FOR MAKING SAME

BACKGROUND

1. Technical Field

The present disclosure relates to device housings, particularly to an device housing coating with a self-repairing coating, and a method for making the device housing.

2. Description of Related Art

Decorative metallic coatings are often deposited on housings of electronic devices. The metallic coatings are typically formed by vacuum deposition to be nonconductive so as to not block electromagnetic waves. These metallic coatings may be transparent or translucent. However, the metallic coatings are not self-repairing.

Therefore, there is room for improvement within the art.

BRIEF DESCRIPTION OF THE FIGURES

Many aspects of the device housing can be better understood with reference to the following FIGURE. The components in the FIGURE are not necessarily drawn to scale, the emphasis instead being placed upon clearly illustrating the principles of the device housing.

The FIGURE is a cross-section view of an exemplary embodiment of a device housing.

DETAILED DESCRIPTION

The FIGURE shows a device housing 10 according to an exemplary embodiment. The device housing 10 including a substrate 11, a base coating 13 painted on a surface of the substrate 11, a metallic coating 15 formed on the base coating 13, and a self-repairing coating 17 formed on the metallic coating 15.

The device housing 10 may be, for example, a housing of a mobile phone, personal digital apparatus (PDA), laptop, MP3, MP4, GPS navigator, or a digital camera.

The substrate 11 may be made of plastic material selected from a group consisting of polycarbonate (PC), polyethylene (PE), polymethyl methacrylate (PMMA), and a mixture of polycarbonate and acrylonitrile-butadiene-styrene plastics (PC+ABS). The substrate 11 may instead be made of ceramic or glass.

The base coating 13 may be a polyurethane resin coating. The base coating 13 may be transparent and has a thickness of about 5 μm to about 10 μm. The base coating 13 has a smooth surface for enhancing the bonding between the base coating 13 and subsequent coatings.

The metallic coating 15 may be formed on the base coating 13 by vacuum sputtering or vacuum vapor deposition. The metallic coating 17 has a metallic appearance. The metallic coating 15 may includes a plurality of zirconium oxide ($ZrO_2$) layers 151 alternating with a plurality of aluminum oxide ($Al_2O_3$) layers 153. The metallic coating 15 may comprise two to four sets of alternating zirconium oxide ($ZrO_2$) layers 151 and aluminum oxide ($Al_2O_3$) layers 153. One zirconium oxide layer 151 is directly formed on the base coating 13, and one zirconium oxide layer 151 abuts against the self-repairing coating 17. The total thickness of the metallic coating 15 may be about 300 nm-400 nm. The thickness of the metallic coating 15 is selected to present a metallic appearance for the device housing 10 without interfering with radio transmission capabilities.

The self-repairing coating 17 has a thickness of about 25 μm-30 μm. The self-repairing coating 17 may be a polyurethane resin coating. The self-repairing coating 17 substantially comprises trimethylene oxide and polyhydric alcohols.

When the self-repairing layer 17 is scratched, a ring of trimethylene oxide is also ripped open. Breaking the surface of the self-repairing coating 17 allows ultraviolet light to enter the scratch, and strike the active site of the trimethylene oxide rip. The trimethylene oxide and polyhydric alcohols then bond with each other across the damaged area, cooperatively forming an elastomeric network which pulls the two sides of the scratch together to eliminate the scratch. Any scratch with a width of about 1 μm-100 μm can be repaired automatically, when the self-repairing layer 17 is exposed to ultraviolet light with a wavelength of about 315 nm-380 nm.

A method for making the device housing 10 may includes the following steps.

The substrate 11 is provided. The substrate 11 may be made of plastic, glass, ceramic, or metal. The substrate 11 can be cleaned in an ultrasonic cleaning machine with a solution to remove grease from the surface of the substrate 11. The solution can be ethanol, acetone and/or other organic solvents.

The base coating 13 is sprayed on the substrate 11. The paint used to form the base coating 13 includes polyurethane resin, the solvent of the paint is ethyl acetate, wherein the mass percentage of polyurethane resin is about 55-70%, and the mass percentage of the ethyl acetate is about 20-30%.

The metallic coating 15 is formed on the base coating 13 by vacuum evaporation coating process. Vacuum evaporation depositing the metallic coating 15 is implemented in a plating chamber of a vacuum evaporative device (not shown). The vacuum evaporator includes a rotating bracket (not shown), to hold and rotate the substrate 11. The plating chamber is then evacuated to about $9.0\times10^{-5}$ Pa-$3.0\times10^{-3}$ Pa. The rotating bracket is started at a speed between about 15 revolutions per minute (r/min). Zirconium oxide or aluminum oxide may be used as an evaporation target for the deposition. The evaporation target may be electron beam heated to evaporate and deposit on the substrate 11 to form the metallic coating 15. Oxygen ($O_2$) may be used to supplement oxygen (O) lost during deposition of the zirconium oxide layers 151 and/or aluminum oxide layers 153. During deposition of the zirconium oxide layers 151, zirconium oxide may be used as an evaporation target to deposit the zirconium oxide layers 151. The deposit rate of the zirconium oxide layers 151 may be about 1.5 angstroms per second (Å/S)-2.5 Å/S. The partial pressure of the $O_2$ is set to about $8.0\times10^{-3}$ Pa-$1.5\times10^{-2}$ Pa. During deposition of the aluminum oxide layers 153, aluminum oxide may be used as an evaporation target. The deposit rate of the aluminum oxide layers 153 may be about 2 angstroms per second (Å/S)-3 Å/S. The partial pressure of the $O_2$ is set to about $9.5\times10^{-3}$ Pa-$3.0\times10^{-2}$ Pa. The inside of the plating chamber may be heated to about 50° C.-80° C. during the deposition process.

The self-repairing coating 17 is sprayed on the metallic coating 15. The paint used to form the self-repairing coating 17 comprises polyurethane resin, trimethylene oxide and polyhydric alcohols, the solvent of the paint is ethyl acetate, wherein the total mass percentage of polyurethane resin, trimethylene oxide and polyhydric alcohols is about 70-80%, and the mass percentage of the ethyl acetate is about 5-20%.

Then the self-repairing coating 17 undergoes a heat-curing process at a temperature between about 80° C.-130° C. for 90 min-150 min. After being cured, the necessary un-evaporated polyhydric alcohols for the self-repair process will remain in the self-repairing coating 17.

Once processed, the coatinged device housing 10 will have a metallic appearance and be self-repairing when exposed to ultraviolet light.

EXAMPLE

In experiments, samples of PC substrate were pretreated (cleaned) then painted with a base coating 13. The diameter of the nozzle of the spray gun (not shown) used to spray the base coating 13 was 0.8 mm. The pressure of the spray was set to 0.35 Pa. The paint used to form the base coating 13 included polyurethane resin, the solvent of the paint was ethyl acetate, wherein the mass percentage of polyurethane resin was 65%, and the mass percentage of the ethyl acetate was 25%. And then the base coating 13 was cured by heat-curing process at a temperature of 80° C. for 15 min.

The PC substrate coatinged with a base coating 13 was placed into the plating chamber of a vacuum evaporative device. The plating chamber was evacuated to $3.0 \times 10^{-3}$ Pa. The rotating bracket was started at a speed of 15 r/min. The temperature in the plating chamber was set to 70° C. During deposition of the zirconium oxide layers, the depositing rate of the zirconium oxide layers 151 was set to 1.6 (Å/S), the partial pressure of the $O_2$ was set to $1.5 \times 10^{-2}$ Pa. During deposition of the aluminum oxide layers 153, the depositing rate of the aluminum oxide layers 153 was set to 2 (Å/S), the partial pressure of the $O_2$ was set to $9.5 \times 10^{-3}$ Pa.

The diameter of the nozzle of the spray gun used to spray the base coating 13 was 0.8 mm. The pressure of the spray was set to 0.35 Pa. The paint used to form the self-repairing coating 17 comprised polyurethane resin, trimethylene oxide and polyhydric alcohols, the solvent of the paint was ethyl acetate, wherein the total mass percentage of polyurethane resin, trimethylene oxide and polyhydric alcohols was 75%, and the mass percentage of the ethyl acetate was 15%. And then the self-repairing coating 17 underwent a heat-curing process at a temperature of 80° C. for 2 hours.

SCRATCH RECOVERY TEST RESULTS

The samples were scratched with abrasive paper, and then exposed to ultraviolet light at a wavelength of 315 nm-380 nm. The scratch recovery times for healed samples are listed in Table 1, as below.

TABLE 1

| Width of Scratch/μm | Rcovery Time/h |
|---|---|
| 1-2 | 50 |
| 6-7 | 120 |
| 25-30 | 250 |
| 60-65 | 450 |
| 80-85 | 600 |
| 95-100 | 720 |

As the test data in Table 1 shows, the self-repairing coating 17 can repairing a scratch with a width of 1 μm-100 μm.

RADIO FREQUENCY (RF) TEST RESULTS

The samples manufactured by the example were tested using an "E5071C" type spectrograph made by Agilent Technologies. The test frequency range was from 100 KHz to 4.5 G Hz. Three of the test frequency channels were 900 MHz, 1800 MHz and 2500 MHz. The results are listed in Table 2, as below.

TABLE 2

| | 900 MHz | | | 1800 MHz | | | 2500 MHz | | |
|---|---|---|---|---|---|---|---|---|---|
| samples | Electro-magnetic peak/MHz | Electro-Magnetic wave intensity/dB | Spectrum Bandwidth/MHz | Electro-magnetic peak/MHz | Electro-Magnetic wave intensity/dB | Spectrum Bandwidth/MHz | Electro-magnetic peak/MHz | Electro-Magnetic wave intensity/dB | Spectrum Bandwidth/MHz |
| standard value | 806.0 | −15.06 | 220.5 | 1713.0 | −18.34 | 289.5 | 2500.0 | −21.47 | 351.56 |
| example | 806.0 | −15.03 | 220.5 | 1713.0 | −18.01 | 289.3 | 2500.0 | −21.45 | 351.36 |

The test data in Table 2 shows the self-repairing coating 17 formed on the metallic coating 15 had no influence on the electromagnetic waves.

It should be understood, however, that though numerous characteristics and advantages of the present embodiments have been set forth in the foregoing description, together with details of functions of the embodiments, the disclosure is illustrative only, and changes may be made in detail within the principles of the disclosure to the full extent indicated by the broad general meaning of the terms in which the appended claims are expressed.

What is claimed is:

1. An device housing, comprising:
   a substrate;
   a base coating formed on the substrate, the base coating being formed by using a paint substantially comprising polyurethane resin and ethyl acetate
   a metallic coating formed on the base coating by vacuum sputtering or vacuum vapor deposition, the metallic coating comprising a plurality of zirconium oxide layers alternating with a plurality of aluminum oxide layers; wherein the metallic coating comprising two to four sets of alternating zirconium oxide layers and aluminum oxide layers; and
   a self-repairing coating formed on the metallic coating, the self-repairing coating substantially comprising trimethylene oxide and polyhydric alcohols.

2. The device housing as claimed in claim 1, wherein the self-repairing coating has a thickness of about 25 μm-30 μm.

3. The device housing as claimed in claim 1, wherein the self-repairing coating is capable of repairing a scratch with a width of 1 μm-100 μm, when the self-repairing layer is exposed to ultraviolet light at a wavelength of 315 nm-380 nm.

4. The device housing as claimed in claim 1, wherein the metallic coating has a total thickness of about 300 nm-400 nm.

5. The device housing as claimed in claim 1, wherein one zirconium oxide layer directly formed on the base coating, and one zirconium oxide layer abutting the self-repairing coating.

6. The device housing as claimed in claim 1, wherein the base coating has a thickness of about 5 μm-10 μm.

7. The device housing as claimed in claim 1, wherein in the paint the mass percentage of polyurethane resin is about 55-70%, and the mass percentage of the ethyl acetate is about 20-30%.

8. The device housing as claimed in claim 1, wherein the substrate is made of plastic, ceramic or glass.

* * * * *